United States Patent [19]

Ferrentino

[11] 4,250,914
[45] Feb. 17, 1981

[54] FLOW REGULATOR

[75] Inventor: Antonio Ferrentino, Monza, Italy

[73] Assignee: Industrie Pirelli Societa per Azioni, Milan, Italy

[21] Appl. No.: 958,516

[22] Filed: Nov. 7, 1978

[30] Foreign Application Priority Data

Dec. 1, 1977 [IT] Italy .............................. 30222 A/77

[51] Int. Cl.³ .............................................. G05D 7/01
[52] U.S. Cl. ..................................... 137/501; 251/282
[58] Field of Search ................................ 137/500–504, 137/505.18; 251/282

[56] References Cited

U.S. PATENT DOCUMENTS

| | | | |
|---|---|---|---|
| 2,307,949 | 1/1943 | Phillips | 251/282 X |
| 2,865,397 | 12/1958 | Chenault | 137/501 X |
| 2,909,191 | 10/1959 | Horton | 137/501 |
| 2,916,047 | 12/1959 | Butcher | 137/501 |
| 3,121,440 | 2/1964 | Heller | 251/282 X |
| 3,214,134 | 10/1965 | Noakes | 251/282 |
| 3,602,252 | 8/1971 | Barnes | 137/501 X |
| 4,043,332 | 8/1977 | Metcalf | 137/501 X |

FOREIGN PATENT DOCUMENTS 500790 6/1930 Fed. Rep. of Germany ...... 137/505.18

Primary Examiner—Robert G. Nilson
Attorney, Agent, or Firm—Brooks, Haidt, Haffner & Delahunty

[57] ABSTRACT

A valve for controlling fluid flow having a cavity divided into first and second chambers by a first bellows carrying a plunger which has one end extending into the valve outlet opening at one wall of the first chamber. A second bellows, co-axial with the first bellows, acts between the end of the plunger remote from the opening and a wall of the second chamber and forms a third chamber in communication with fluid at the outside of the opening by way of a longitudinal conduit in the plunger. Inlet fluid is supplied to the second chamber and is supplied to the first chamber by way of a manually operable flow control valve. The plunger position is dependent upon the difference in fluid pressures in the first and second chambers and varies the size of the opening. Fluid in the third chamber counterbalances the pressure of the fluid at the outlet on the end of the plunger thereat.

5 Claims, 3 Drawing Figures

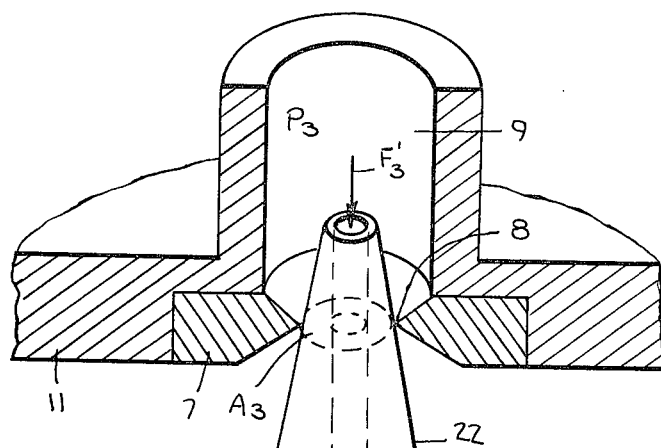
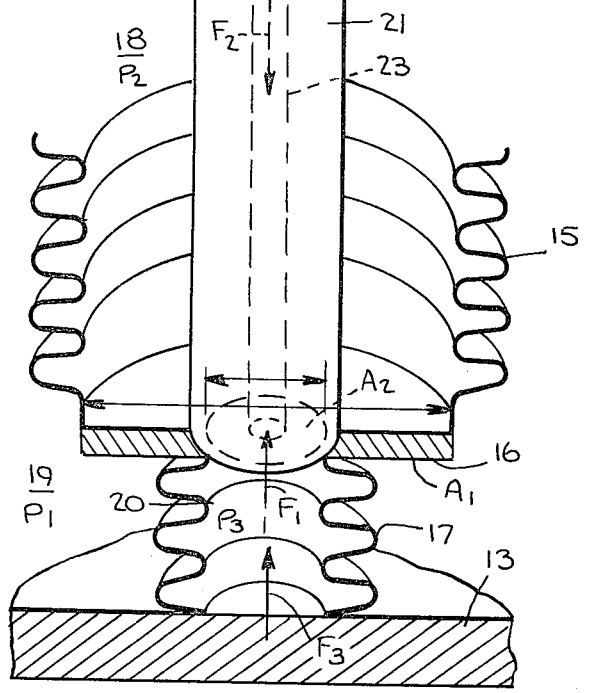
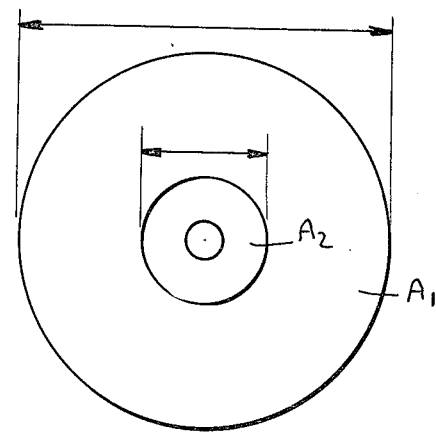

FLOW REGULATOR

BACKGROUND OF THE INVENTION

1. Field of the Invention

The present invention relates to a valve for controlling fluid flow, and more particularly to a flow regulating valve adapted to be inserted into a conduit for conveying oil under pressure from a reservoir to an oil-filled electric cable.

2. Discussion of the Prior Art

Regulating valves are used in conjunction with oil-filled electric cables to provide an oil flow limited to a fixed calibrated level when the cable is functioning normally, and to provide a variable flow, in case of partial or total lesions damaging the cable itself.

In case of partial or total rupture of the cable it is necessary for the valve to regulate and transmit flows over an ample range of flow rates. At first, elevated flows at calibrated levels are required for protecting the cable during a transitional thermal phase of cooling and thereafter the flow rate should be gradually decreased down to a value not greater than what is strictly necessary for preventing the entry into the cable of foreign bodies present in the ambient. On the other hand, very precise regulation of flow at very low rates allows for limiting to the indispensable minimum the outflow of oil that, for the long periods elapsing between the damage and the repair, as in the case of submarine cables, can be the cause of great economic losses and possibly of considerable problems of pollution.

Among the valves that are known and generally employed, attention is particularly directed to the valve described in applicant's prior South African Pat. No. 77/2626 granted on July 5, 1978 which presents numerous advantages over other kinds of known valves, principally in the regulation of flows of fluid over an ample range of values, as well as flow regulation with great precision at very low flow rates.

The valve of South African Pat. No. 77/2626 comprises a valve body provided with a through cavity, entrance and exit apertures, and an opening with variable opening area for varying the rate of flow of liquid passing through the valve. Inside the through cavity there is a deformable and impermeable membrane that divides the cavity into two compartments sealed with respect to each other, the membrane having means for varying the size of the opening, a conduit being provided inside the valve body which acts as a fluid communication link between the two compartments and fluid flow control means in the conduit, which, when operated, operates means for varying the size of the opening.

Fixed to the base of the membrane and facing the exit conduit are disposed means capable of varying the area of the opening, which means are constituted generally by a conical-shaped plunger that can be inserted more or less deeply, but never totally, into the opening itself and spring means urging the plunger away from the opening. These means of varying the area of the opening are controlled by two forces that act in the axial direction: a first force determined by the pressure difference that is established between the two compartments through the action of the fluid flow control means; and a second force determined by the difference between the pressure values upstream and downstream of the valve. This second force is effectively resisted by the action of the spring means. The advantages of this prior art valve are derived from the employment of the deformable and impermeable membrane that divides the through cavity into two fluid-tight compartments which are in communication by means of a conduit within which the fluid flow control means act. This arrangement makes it possible to adopt extremely variable correlations between the control surface of the membrane subjected to the difference of pressure between the two compartments, and the fluid flow regulated by the flow control means, permitting controlled flow over a very ample range of flow rates and with great precision, even for very small flow rates.

Although the valve described is quite satisfactory and reliable for numerous and varied applications, it is not completely suitable for certain extreme operating conditions, as when the difference between the fluid pressures upstream and downstream of the valve becomes, for any reason whatsoever, very high, especially when the pressure downstream is less than one fifth of the pressure prevailing upstream of the valve.

Under such extreme conditions the axial force acting on the means capable of varying the area of the opening can become so strong as no longer to be effectively counteracted by the spring means. Hence, there is the danger that in these extreme conditions, the conical shaped end of the plunger may close the opening more than necessary, and may even actually block the fluid flow.

It is accordingly an object of this invention to provide a valve that, while presenting all the advantages of the valve described in the cited South African Pat. No. 77/2626 presents the further advantage of functioning with absolute precision and reliability, even under extreme operating conditions, i.e. when the fluid pressure downstream of the valve is very low compared to the pressure upstream.

SUMMARY OF THE INVENTION

The present invention relates to a valve for regulating the flow of a fluid, comprising a valve body provided with a cavity, an entry aperture, an exit aperture, and an opening with a variable area for varying the flow of fluid passing through the valve and comprising a first deformable and impermeable membrane dividing the cavity into a first and a second chamber, sealed from each other. Means capable of varying the area of the opening are associated with the membrane. A conduit interconnects the first and second chambers and fluid flow control means regulate fluid pressure at the conduit entrance, thus controlling the operation of the means capable of varying the area of the variable opening. There is also a second deformable and impermeable membrane, inside the through cavity, connected at one end to the means capable of varying the area of the opening, and connected at its other end to a wall of the cavity, each end of the second membrane defining a surface area that is substantially equal to the area within a circle that externally delimits the opening. This second membrane defines a third, fluid tight, sealed chamber that does not communicate with the said first and second chambers, but is in communication with the valve exit aperture by means of a channel passing longitudinally through the plunger means capable of varying the area of the opening.

According to a preferred embodiment of the invention, the valve for controlling the flow of fluid according to the invention has a through-channel inside the means capable of varying the area of the opening, which through-channel has a cross-sectional area that is practically negligible with respect to the area within the circle externally delimiting the variable opening.

These and other objects and advantages of the valve of the invention will be more fully understood from the following detailed description of a preferred embodiment of the invention, especially when that description is read with reference to the accompanying drawings.

BRIEF DESCRIPTION OF THE DRAWINGS

In the drawings, in which like reference characters designate like parts throughout:

FIG. 2 is a detail view in perspective of means for varying the area of a valve opening, with portions cut away to show internal structure; and FIG. 3 is an illustration showing the relative area of a base portion of the means shown in FIG. 2.

DETAILED DESCRIPTION OF A PREFERRED EMBODIMENT

Figure 1:
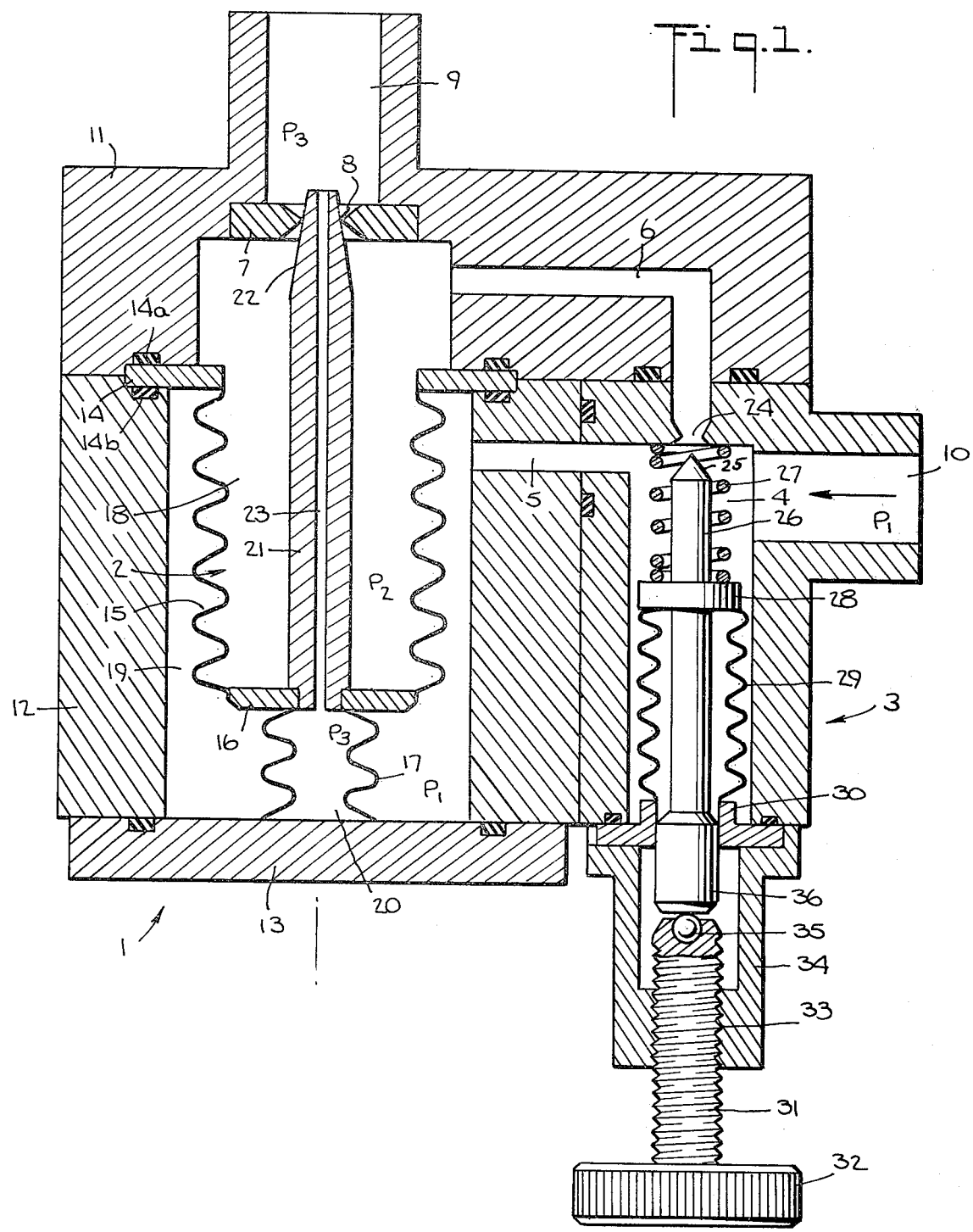
FIG. 1 is a view of the preferred embodiment of the valve in section.

As shown in FIG. 1, the valve according to the present invention comprises a main valve body 1 and a secondary valve body 3; the main body 1 has an internal cavity 2 in communication, through a circular opening 8 formed in a disc 7, with the exit fluid conduit 9, and the secondary body 3 has an internal cavity 4 in communication with the entry fluid conduit 10.

The cavities 2 and 4 are in communication with each other by means of conduits 5 and 6 passing through the two valve bodies 1 and 3.

The main valve body 1 is constituted by three parts 11, 12 and 13. An inwardly extending flange 14 is fitted between the valve body parts 11 and 12, and the joint is tightly sealed by gaskets 14a and 14b. The inner edge of the flange 14 is sealingly secured to one end of a deformable and impermeable membrane 15, shown in the form of a bellows. The other end of the membrane 15 is sealingly secured to the side of a generally disc-shaped base 16.

A second deformable and impermeable membrane 17, also shown formed as a bellows, has its upper end sealingly secured to the bottom of the base 16, and the lower end of the membrane 17 is sealingly secured to the internal wall of the part 13 of the main body 1.

The area of that portion of the base 16 which is enclosed by the membrane 17 is substantially equal to the area of a circle delimiting the circular opening 8.

The pair of bellows-like deformable and impermeable membranes 15 and 17 divide the cavity 2 into three fluid-tight chambers 18, 19 and 20 that do not communicate directly with each other. From the side of the base 16 that faces the chamber 18, there extends perpendicularly a plunger 21 having such a length that a conical shaped end portion 22 can be inserted into the opening 8. The plunger 21 is provided longitudinally with a through-canal 23. The plunger 21 is tightly secured in place in a central hole in the base 16 and extends through the base 16, as does the through-canal 23, opening on to the chamber 20 within the bellows 17. The bellows 15 and 17 have spring properties and are selected so that they exert a net bias on the plunger 21 in the opening direction whereby fluid can pass through the opening 8 when the pressure difference between the fluid in the chambers 18 and 19 is insufficient to cause the plunger 21 to close the opening 8.

In a preferred embodiment of the valve according to the invention, the canal or channel 23, which puts the chamber 20 into communication with the exit fluid conduit 9, has a transverse sectional area that is practically negligible with respect to the area of a circle delimiting the circular opening 8.

The secondary valve body 3 has its internal cavity 4 connected directly to the entry fluid conduit 10 and in communication through the conduits 5 and 6 respectively, with the separate chambers 19 and 18 existing in the cavity 2 of the main body 1. Within the cavity 4 there are pilot flow rate control means constituted generally by a plunger 26, the conical shaped end 25 of which can be inserted more or less deeply into an opening 24 at the entrance to conduit 6.

The plunger 26 is positionable as desired, for example by a screw mechanism. A preferred positioning mechanism is shown in FIG. 1. A helicoidal spring 27 coiled around the plunger 26 is compressed between the wall of the cavity 4 adjacent the opening 24 and an annular fixed flange 28 of the plunger 26. A deformable and impermeable bellows-like membrane 29 is secured sealingly to the side of the flange 28 opposite the spring 27. The other end of the bellows-like membrane 29 is secured sealingly to a flange 30. A regulating screw 31 with a rotatable knob 32 is threadedly fitted in a threaded hole 33 through a cover 34 secured on the secondary valve body 3. A rotatable ball 35 mounted at the end of the screw 31 engages an end portion 36 of the plunger 26 remote from the conical end 25 for advancement or withdrawal of the plunger 26 by rotation of the knob 32.

The operation of the flow regulator of the invention will now be described. Fluid coming from the feeding tank passes, at a pressure $p_1$, through the entry conduit 10 and fills (at the same pressure $p_1$) the cavity 4 and the chamber 19, which communicate with each other through the conduit 5. From the valve cavity 4, the fluid also flows through the opening 24, where the pressure is decreased to a selected pressure $p_2$ through the action of the pilot flow control means comprising the selectively positionable plunger 26. This fluid, under the pressure $p_2$, passes through the passage 6 to the valve chamber 18. From the chamber 18 the fluid flows through the opening 8, where it is subjected to a further reduction of pressure, to a pressure value $p_3$, through the action of the means 22 capable of varying the area of the opening 8. Fluid thence leaves the valve through the exit conduit 9 and fluid in the conduit 9 is maintained at the same pressure $p_3$ as fluid in the chamber 20, which is in communication with the conduit 9 via the through-canal 23 of the plunger 21.

When in a steady state, the three separate chambers 18, 19 and 20 are maintained at the pressures $p_2$, $p_1$ and $p_3$ respectively, and the means 21, 22, etc. capable of varying the area of the opening 8 are loaded by forces determined by the said pressures, distributed uniformly, respectively on the annular surface of the base 16 that is not occupied by the plunger 21, on the annular surface of the base 16 outside the bellows-like membrane 17, and on the surface of the base 16 inside the membrane 17 that is substantially equal to the area of the circle externally delimiting the opening 8.

The equilibrium between these forces determines a certain position of the conical-shaped end 22 of the plunger 21 within the opening 8, thus maintaining a constant rate of flow of the fluid through the valve.

The steady state conditions are nevertheless, subject to disturbances that tend to make the flow rate vary. With the valve of the present invention the flow rate through the valve can always be maintained constant in spite of such disturbances of whatever origin, since the means capable of varying the area of the opening 8 are exclusively controlled by the difference between the values of the pressures $p_1$ and $p_2$ predetermined by the pilot flow control means in the valve body 3.

For a fuller understanding of the flow rate control process, reference is made to FIGS. 2 and 3, FIG. 2 being a detailed view of the means capable of varying the area of the opening 8, constituted by the base 16 secured to the plunger 21 which has the cone-shaped end 22 and through-channel 23.

The lower surface of the base member 16, outside the central area surrounded by the bellows-like member 17 at its circle of connection to the base member 16, is exposed to the fluid in the chamber 19 at the pressure $p_1$. FIG. 3 shows the annular area $A_1$ of the base member 16, which is subjected to pressure $p_1$, as the outer ring. The force F1 produced by pressure $p_1$ acting on the annular area $A_1$ urges the plunger 21 in its axial direction, upwards in FIG. 2, and tends to close the opening 8 by forcing the conical portion 22 of the plunger 21 into the opening 8.

The annular area $A_2$ shown in FIG. 3, that is, the area of the base member 16 within the bellows-like element 17 is subjected to an upwardly directed force F3 proportional to the pressure $p_3$ prevailing within the chamber 20 within the bellows 17 which is in communication with the exit conduit 9 via the through-channel 23. The cross-sectional area of the through-channel 23, being subjected to the same pressure at both ends, can be ignored. The area $A_2$ is substantially equal to the area within the opening 8 and indicated in FIG. 2 at $A_3$.

The upwardly directed forces just described are opposed by downwardly directed forces, that is, forces tending to move the plunger 21 away from the opening 8 and acting along the longitudinal axis of the plunger 21.

The annular upper surface of the base member 16 surrounding the plunger 21 and within the bellows 15 is exposed to a downwardly directed force F2 proportional to the pressure $p_2$ of the fluid within the bellows 15 and an area of the base 16 equivalent to the area $A_1$. The pressure $p_2$ is controlled by the free area of the opening 24 of the passage 6. The area $A_3$ of the conical plunger portion 22, while not exactly the same as the area of a circle delimiting the opening 8, is almost the same as the area of such circle because the distance between the portion 22 and the inner edge of the disc 7 is very small.

As previously noted, the area $A_3$ is substantially equal to the area $A_2$ and the cross-sectional area of the through channel 23 is negligible, so the downward force $F^1_3$ imposed upon by pressure $p_3$ on the area $A_3$ is proportional to the area $A_3$ and is substantially equal to and oppositely directed to the upward force $F_3$ acting on the area $A_2$. That is, the area $A_2$ is under pressure $p_3$ acting upwardly, and the area $A_3$ is exposed to pressure $p_3$ acting downwardly, so that these forces are substantially equal and oppose and cancel each other.

The resultant unbalanced force acting to move the plunger 21 towards or away from a position blocking the opening 8 is thus the sum of the upward force $F_1$ produced by the pressure $p_1$ acting on the area $A_1$ and the opposing downward force $F_2$ imposed by the pressure $p_2$ acting on the area equivalent to $A_1$. This resultant force is thus determined by the difference between the pressures $p_1$ and $p_2$ which is controlled by the free area of the opening at 24.

On the other hand, since the rate of flow of fluid through the valve from the inlet 10 to exit 9 is ultimately determined by the area of the free opening at 8, and hence by the relative position of the plunger 21 with respect to the exit 9, the rate of flow through the valve is independent of the difference in the pressures $p_1$ and $p_3$ respectively upstream and downstream of the valve, and the flow rate depends only on the difference between the pressures $p_1$ and $p_2$ controlled by the pilot flow regulation means controlling the pressure drop at the variable opening 24.

Hence, a constant rate of fluid flow can be produced through the valve regardless of the difference in the fluid pressure entering and exiting from the valve.

Although a preferred embodiment of the present invention has been described and illustrated, it will be apparent to those skilled in the art that various modifications may be made without departing from the spirit and scope of the invention.

The embodiments of the invention in which an exclusive property or privilege is claimed are defined as follows:

1. A valve for regulating the flow of a fluid, said valve comprising:

a valve body having an internal cavity, a fluid inlet, a fluid outlet and an opening permitting fluid flow from said cavity to said outlet;

a first movable, fluid impermeable bellows in said cavity, one end of said first bellows being connected in fluid-tight relation to a wall of said cavity and having a base connected in fluid-tight relation with the other end thereof to form a first chamber within said first bellows and a second chamber outside said first bellows with said opening at one wall of said first chamber, said first bellows being movable by fluid in said chambers;

fluid conduit means interconnecting said fluid inlet with said first and second chambers;

pressure controlling means in said fluid conduit means for controlling the difference in pressure between the fluid in said first chamber and the fluid in said second chamber;

opening varying means for varying the area of said opening, said opening varying means being connected to said base and extending to said opening, said opening varying means being subject to the pressure of the fluid in said outlet and being movable by said first bellows for varying the area of said opening dependent upon the difference between fluid pressure in said second chamber and the fluid pressure in said first chamber whereby the flow of fluid from said inlet to said outlet may be varied; and a second movable, fluid impermeable bellows acting between said body and said base, said second bellows being mounted coaxially with said first bellows and one end of said second bellows being connected in fluid-tight relation to a side of said base which is outside said first bellows and the other end of said second bellows being connected in fluid-tight relation to a wall of said cavity outside said first chamber to form a third chamber within said second chamber, said third chamber being out of fluid communication with said first and second chambers and being in fluid communication with said fluid outlet and said second bellows being proportioned and positioned to apply a force to said opening varying means in a direction which decreases the area of said opening which is substantially equal to the force applied to said opening varying means by fluid in said fluid outlet in a direction which increases the area of said opening, whereby the area of said opening is substantially independent of the pressure of the fluid in said outlet and is dependent on the pressure difference between the fluid in said first chamber and the fluid in said second chamber.

2. A valve as set forth in claim 1 wherein said opening varying means is a plunger which is mounted on and movable with said base and which extends into said opening, said plunger having a through-channel which extends from the outlet side of said opening to said third chamber thereby providing fluid communication between said outlet and said third chamber, the cross-sectional area of said channel, at least at said outlet side of said opening being substantially negligible as compared to the cross-sectional area of said opening.

3. A valve as set forth in claim 2 wherein a wall of said third chamber is formed by one of said plunger and said base, said last-mentioned wall having an area substantially equal to the area of said opening.

4. A valve as set forth in claim 2 wherein said plunger is within said first bellows and has a conical end extending into said opening and said longitudinal channel extends from said conical end thereof to said third chamber.

5. A valve as set forth in claims 1, 2, 3 or 4 wherein said pressure controlling means comprises a manually adjustable plunger intermediate said inlet and said fluid conduit means interconnecting said inlet and said first chamber, said last-mentioned conduit means having an opening for the passage of fluid from said inlet to said last-mentioned conduit means and said last-mentioned plunger having a conical end extending into said last-mentioned opening.

* * * * *